United States Patent
Lee et al.

(10) Patent No.: US 10,272,951 B2
(45) Date of Patent: Apr. 30, 2019

(54) IMPACT-ABSORBING REINFORCEMENT STRUCTURE FOR CENTER PILLARS

(71) Applicants: HYUNDAI MOTOR COMPANY, Seoul (KR); KIA Motors Corporation, Seoul (KR)

(72) Inventors: Moon Seop Lee, Yongin-si (KR); Jeong Min Cho, Suwon-si (KR); Hoon Chang, Seoul (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 79 days.

(21) Appl. No.: 15/701,708

(22) Filed: Sep. 12, 2017

(65) Prior Publication Data
US 2018/0118279 A1 May 3, 2018

(30) Foreign Application Priority Data
Oct. 31, 2016 (KR) .......................... 10-2016-0143498

(51) Int. Cl.
*B62D 25/04* (2006.01)
*B62D 29/04* (2006.01)
*B62D 21/15* (2006.01)

(52) U.S. Cl.
CPC ........... *B62D 25/04* (2013.01); *B62D 21/157* (2013.01); *B62D 29/043* (2013.01)

(58) Field of Classification Search
CPC ...... B62D 21/157; B62D 25/04; B62D 29/04; B62D 29/043
USPC ........................... 296/181.2, 187.12, 193.06
See application file for complete search history.

(56) References Cited

U.S. PATENT DOCUMENTS

| 9,738,322 B2 * | 8/2017 | Matthiessen ........... B62D 25/02 |
| 10,065,683 B2 * | 9/2018 | Steffens ................. B62D 29/00 |
| 2011/0241383 A1 * | 10/2011 | Shin ..................... B62D 29/002 |
| | | 296/193.06 |

(Continued)

FOREIGN PATENT DOCUMENTS

| JP | 4696651 B2 | 6/2011 |
| JP | 2013212730 A | 10/2013 |
| KR | 10-2009-0130099 A | 12/2009 |

(Continued)

*Primary Examiner* — Jason S Daniels
(74) *Attorney, Agent, or Firm* — McDonnell Boehnen Hulbert & Berghoff LLP

(57) ABSTRACT

Discribed is an impact-absorbing reinforcement structure for center pillars including a high-strength section, a medium-strength section and a low-strength section, divided from each other and integrally formed. The high-strength section is composed of carbon fiber reinforced plastic (CFRP) formed by impregnating carbon fiber with a resin and is disposed at the upper region of a vehicle center pillar; the low-strength section is composed of a composite material formed by impregnating carbon fiber and olefin-based fiber with a resin, has lower strength than the high-strength section and is disposed at a lower region of the vehicle center pillar; and the medium-strength section is composed of a composite material formed by impregnating carbon fiber and olefin-based fiber with a resin, has strength between the strength of the high-strength section and the low-strength section and is disposed at a central region of the vehicle center pillar.

15 Claims, 7 Drawing Sheets

(56) References Cited

U.S. PATENT DOCUMENTS

2017/0137066 A1\* 5/2017 Ayuzawa ........... B62D 25/2036

FOREIGN PATENT DOCUMENTS

| KR | 10-2010-0034836 A | 4/2010 |
| KR | 10-2010-0075142 A | 7/2010 |
| KR | 10-2012-0063012 A | 6/2012 |
| KR | 10-2013-0071207 A | 6/2013 |
| KR | 10-2014-0043318   | 4/2014 |
| KR | 10-2014-0050779 A | 4/2014 |
| KR | 10-1509966 B1     | 4/2015 |

\* cited by examiner

[Fig.1]
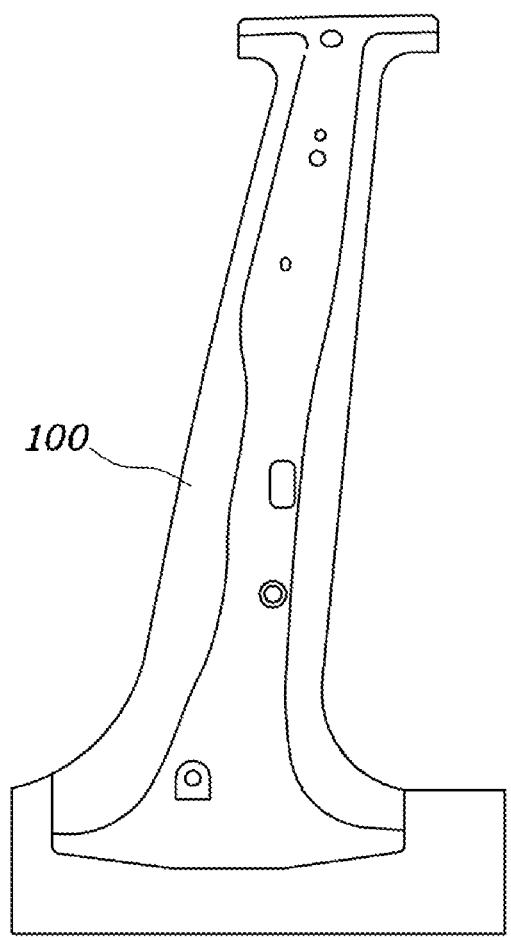

[Fig.2]
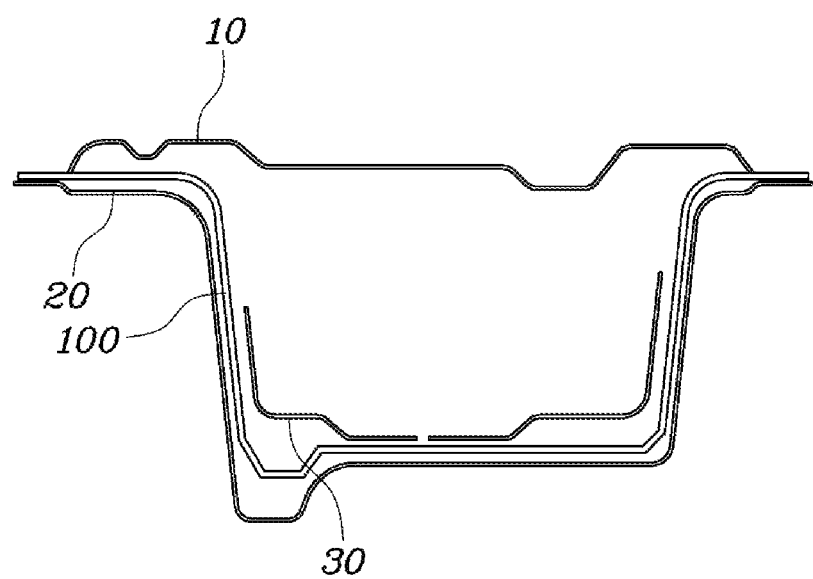

[Fig.3]
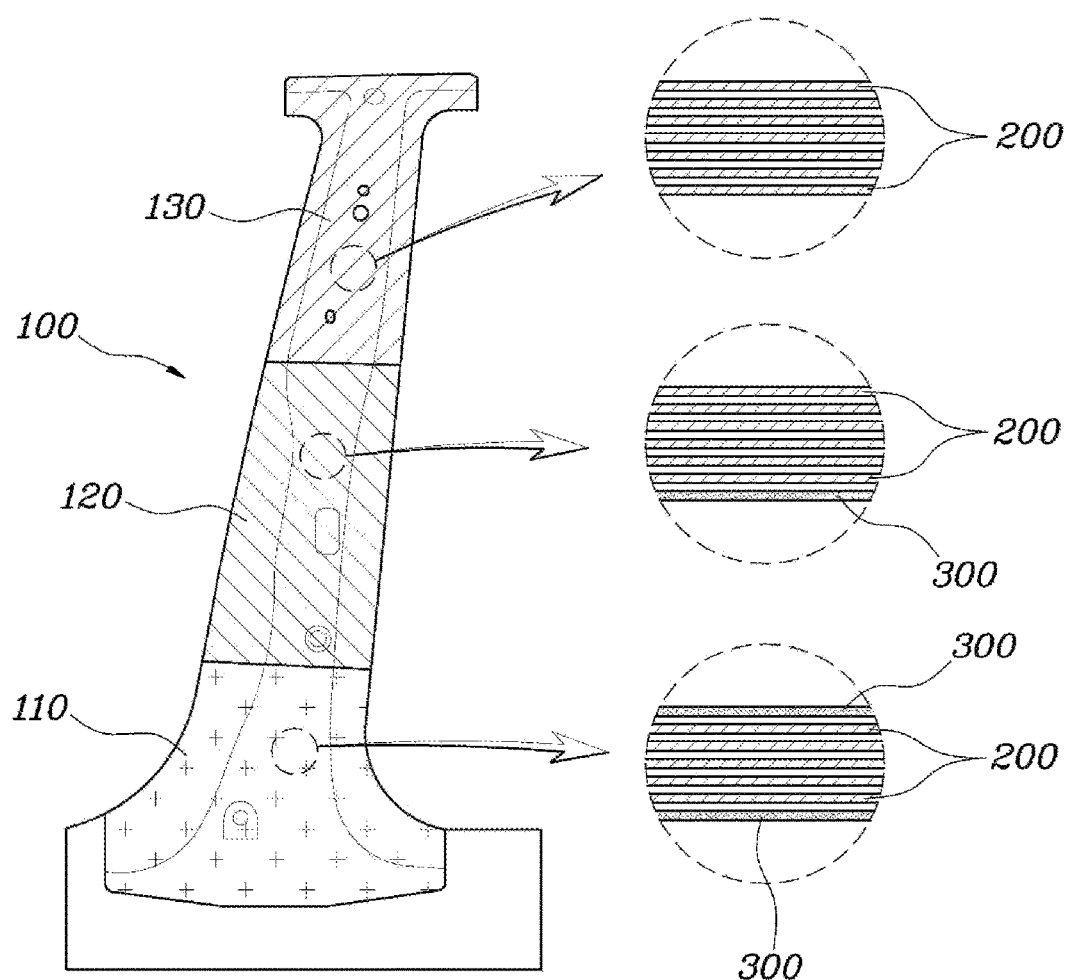

[Fig.4]
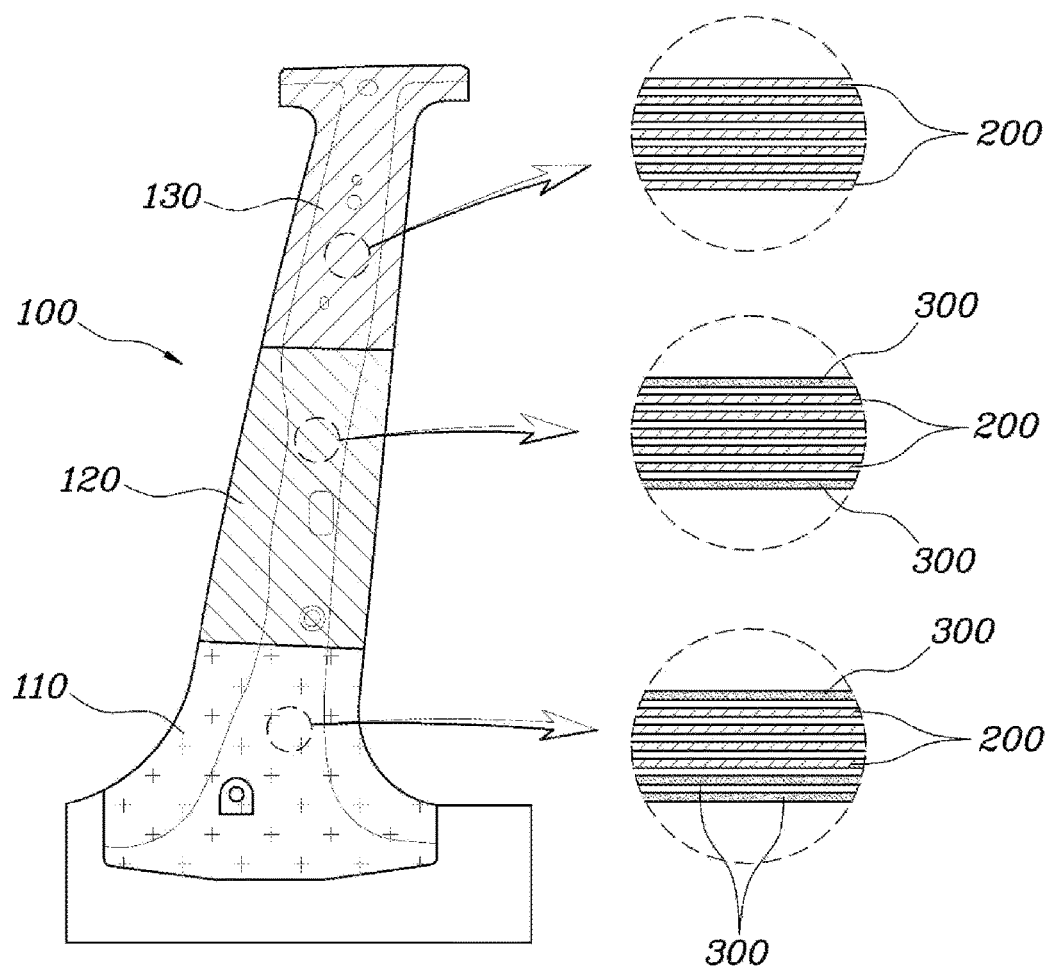

[Fig.5]
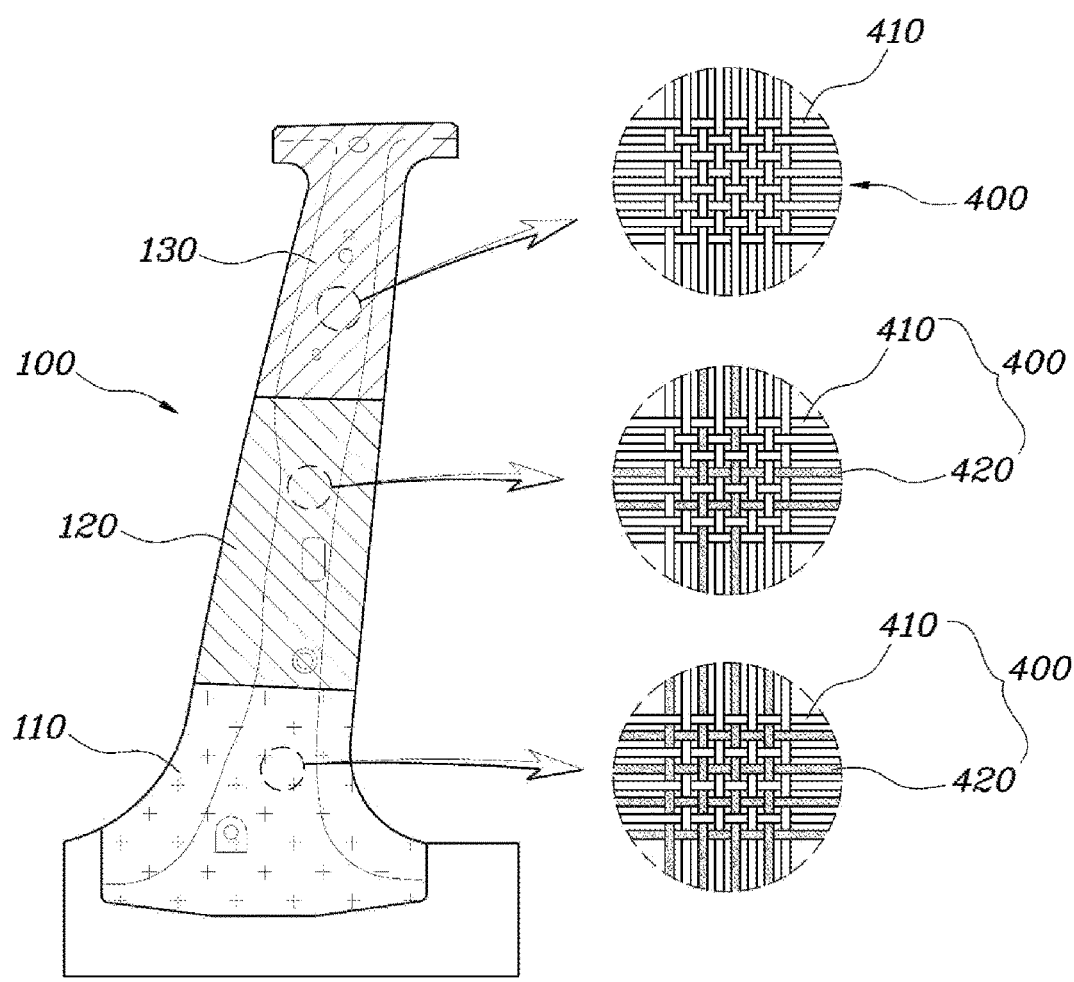

[Fig.6A]
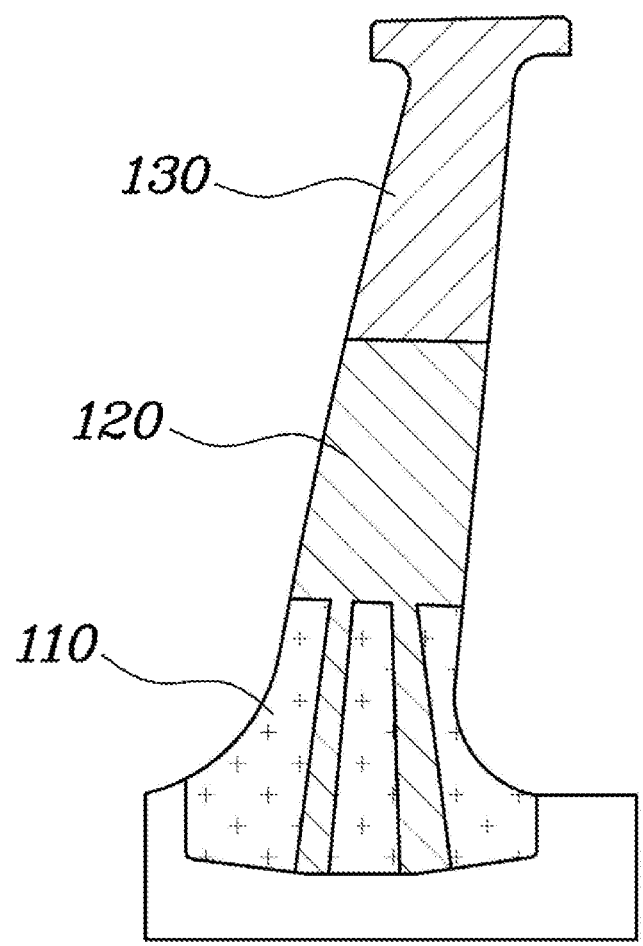

[Fig.6B]
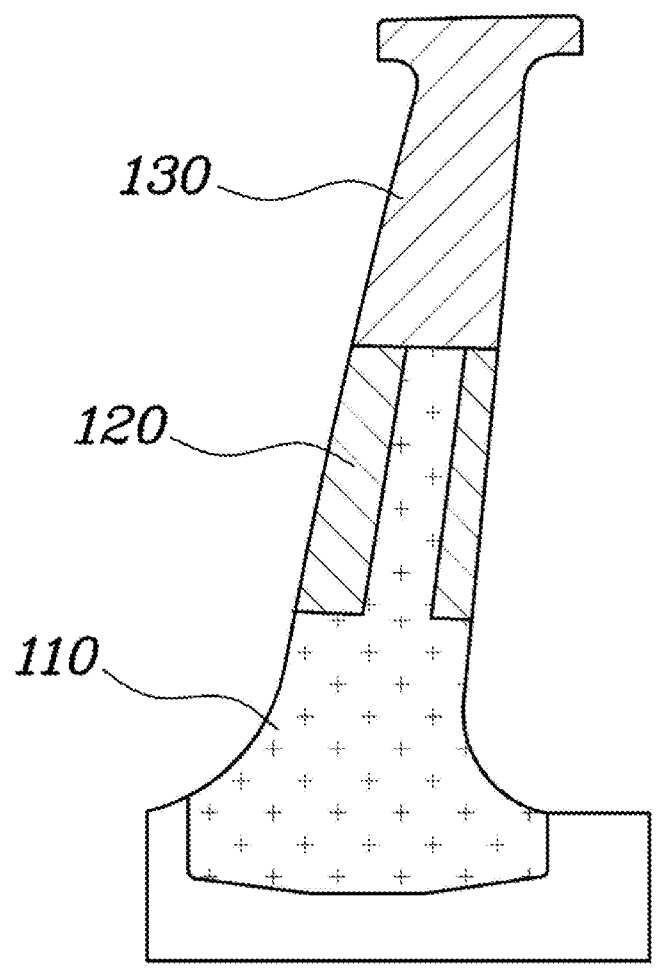

IMPACT-ABSORBING REINFORCEMENT STRUCTURE FOR CENTER PILLARS

CROSS-REFERENCE TO RELATED APPLICATION

This application claims priority to and benefit of Korean Patent Application No. 10-2016-0143498, filed on Oct. 31, 2016, in the Korean Intellectual Property Office, the disclosure of which is incorporated herein by reference.

BACKGROUND

1. Technical Field

The present disclosure relates to an impact-absorbing reinforcement structure for center pillars and, more particularly, to an impact-absorbing reinforcement structure for center pillars that absorbs an impact when a side collision occurs.

2. Description of the Related Art

In general, a center pillar of a vehicle divides a front seat and a rear seat from each other and interconnects the upper and lower ends of a vehicle frame, thus serving to protect passengers when an impact occurs on the side surface of the vehicle.

When a side collision accident occurs, impact force is commonly concentrated on the lower end of the center pillar and, thus, the center pillar may be pushed into the interior of the vehicle or fractured, thereby inflicting injury on the driver.

If the center pillar has low strength, it is difficult to prevent deformation of the center pillar towards the interior of the vehicle and, when the vehicle is overturned, it is difficult to secure an inner space of the vehicle. On the other hand, if the center pillar has high strength, the center pillar does not absorb the impact force, but instead is fractured, and thus easily inflicts injury on the driver.

Therefore, methods of varying the strengths of the upper and lower parts of a center pillar have been developed. Example conventional methods include a Tailor Rolled Blank ("TRB") method and a Tailor Welded Blank ("TWB") method. In the TRB method, the center pillar is manufactured such that upper and lower panels of the center pillar have different thicknesses. In the TWB method, upper and lower parts of a center pillar having different strengths are laser-welded together.

In these configurations, the lower part of the center pillar has lower strength than the upper part of the center pillar and, thus, the center pillar may effectively absorb impact force when a side collision occurs.

A separate conventional method for addressing the issues above is substitution of carbon fiber-reinforced plastic ("CFRP") for steel as the material of the vehicle frame.

However, CFRP has relatively constant strength and, thus, it is difficult to vary the strengths of the upper and lower parts of the center pillar.

Therefore, a reinforcement structure for center pillars, formed of CFRP so as to provide a vehicle frame having light weight and high stiffness and that effectively absorbs impact force when a side collision occurs, is required.

The above description has been provided to aid in understanding of the background of the present disclosure and should not be interpreted as conventional technology known to those skilled in the art.

SUMMARY OF THE DISCLOSURE

The present disclosure has been made to address the above problems, and it is an object of the present disclosure to provide an impact-absorbing reinforcement structure for center pillars which is useful in a CFRP-based vehicle frame.

In accordance with an aspect of the present disclosure, the above and other objects can be accomplished by providing an impact-absorbing reinforcement structure for center pillars having a high-strength section, a medium-strength section and a low-strength section, divided from each other and integrally formed as one body, wherein the high-strength section is composed of CFRP formed by impregnating carbon fiber with a resin and is disposed at the upper region of a center pillar; the low-strength section is composed of a composite material formed by impregnating carbon fiber and olefin-based fiber with a resin, has lower strength than the high-strength section and is disposed at the lower region of the center pillar; and the medium-strength section is composed of a composite material formed by impregnating carbon fiber and olefin-based fiber with a resin, has strength between the strength of the high-strength section and the low-strength section and is disposed at the central region of the center pillar.

The high-strength section may be manufactured by stacking a plurality of CFRP layers formed by impregnating carbon fiber with the resin. The low-strength section and the medium-strength section may each be manufactured by stacking one or more CFRP layers formed by impregnating carbon fiber with the resin, and one or more olefin-based fiber layers formed by impregnating an olefin-based fiber with a resin.

The ratio of the total thickness of the one or more olefin-based fiber layers to the entire thickness of the low-strength section may be higher than the ratio of the total thickness of the one or more olefin-based fiber layers to the entire thickness of the medium-strength section.

The low-strength section may include the one or more CFRP layers whose total thickness is form about 55 to about 75% of the entire thickness of the low-strength section, and the one or more olefin-based fiber layers whose total thickness is from about 25 to about 45% of the entire thickness of the low-strength section. The medium-strength section may include the one or more CFRP layers whose total thickness is from about 70 to about 90% of the entire thickness of the medium-strength section, and the one or more olefin-based fiber layers whose total thickness is from about 10 to about 30% of the entire thickness of the medium-strength section.

The low-strength section may have more olefin-based fiber layers than the medium-strength section.

In an example embodiment, the low-strength section may include a total of 7 layers, including 4-5 CFRP layers stacked in parallel and 2-3 olefin-based fiber layers stacked on the outer surfaces of the stacked first layers. The olefin-based fiber layers of the low-strength section may include two second layers, wherein one olefin-based fiber layer is disposed on each of the surfaces of the stacked CFRP layers facing the interior and the exterior of the vehicle. Alternatively, two olefin-based fiber layers may be disposed on the surface of the stacked CFRP layers facing the exterior of the vehicle, and one olefin-based fiber layer may be disposed on the surface of the stacked CFRP layers facing the interior of the vehicle.

In a further example embodiment, the medium-strength section may include 7 layers, including 5-6 CFRP layers stacked in parallel and 1-2 olefin-based fiber layers stacked on the outer surfaces of the stacked CFRP layers. The olefin-based fiber layers of the medium-strength section may include one olefin-based fiber layer disposed on a surface of the stacked CFRP layers facing the interior of the vehicle, or two second layers, with each being disposed on the surfaces of the stacked CFRP layers facing the interior and the exterior of the vehicle respectively.

The low-strength section and the medium-strength section may be manufactured by impregnating a fabric, woven from carbon fiber and olefin-based fiber, with a resin.

The ratio of the carbon fiber in the fabric forming the low-strength section may be lower than the ratio of the carbon fiber in the fabric forming the medium-strength section.

The ratio of the amount of carbon fiber to the amount of the fabric forming the low-strength section may be from about 50 to about 60%, the ratio of the amount of olefin-based fiber to the amount of the fabric forming the low-strength section may be from about 40 to about 50%, the ratio of the amount of carbon fiber to the amount of the fabric forming the medium-strength section may be from about 70 to about 80%, and the ratio of the amount of olefin-based fiber to the amount of the fabric forming the medium-strength section may be about from about 20 to about 30%.

The carbon fiber may have tensile strength of about 5000 MPa or more, fracture elongation of about 2% or less, and a density of from about 1.5 to about 2 $g/cm^3$, and the olefin-based fiber may have tensile strength of about 600 MPa or more, fracture elongation of about 9% or more and a density of about 1 $g/cm^3$ or less.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a view illustrating an outer reinforcement of a center pillar in accordance with an example embodiment of the present disclosure;

FIG. 2 is a cross-sectional view of a center pillar in accordance with an example embodiment of the present disclosure;

FIGS. 3-5 are cross-sectional views a center pillar in accordance with various example embodiments of the present disclosure, showing exploded views of the structure of the high-strength section, the medium-strength section and the low strength section; and FIGS. 6(A) and 6(B) are cross-sectional views illustrating the arrangement of the high-strength section, the medium-strength section and the low-strength section in a center pillar in accordance with various example embodiments of the present disclosure.

DETAILED DESCRIPTION OF THE PREFERRED EMBODIMENTS

Reference will now be made in detail to specific embodiments of the present disclosure, examples of which are illustrated in the accompanying drawings. Wherever possible, the same reference numbers will be used throughout the drawings to refer to the same or like parts.

Technical terms used in the following description serve only to describe specific embodiments and are not intended to restrict the disclosure. In addition, it will be understood that singular expressions used in the following description include plural expressions unless stated otherwise. The term "including" used in the following description will be interpreted as indicating presence of a specific feature, region, number, step, operation, element and/or component, and does not exclude presence of other features, regions, numbers, steps, operations, elements components and/or groups.

All terms including technical terms and scientific terms used in the following description may have meanings which are generally understood by those skilled in the art, unless stated otherwise. In addition, the terms defined in generally used dictionaries are interpreted as having meanings coinciding with related technical documents and the disclosure of the present disclosure, and are not interpreted as having ideal or excessively formal meanings, unless defined otherwise.

Hereinafter, an impact-absorbing reinforcement structure for center pillars in accordance with one example embodiment of the present disclosure is described with reference to the accompanying drawings.

As shown in FIGS. 1 and 2, a center pillar for vehicles includes an outer reinforcement 100, an inner reinforcement 10, an outer panel 20, and an intermediate reinforcement 30. The cross-sectional shapes of the respective elements may be changed and the intermediate reinforcement 30 may be omitted according to the kind of the vehicle and positions on the vehicle.

An impact-absorbing reinforcement structure in accordance with an example embodiment of the present disclosure is applied to outer reinforcement 100. That is, outer reinforcement 100 is divided into a plurality of regions so that the respective regions have different strengths and, thus, absorb impact when a side collision accident occurs.

Outer reinforcement 100 in accordance with an example embodiment of the present disclosure is typically formed of CFRP, and additionally includes an olefin-based fiber so as to complement toughness and elongation and thus prevent the center pillar from being fractured.

For this purpose, as shown in FIGS. 3, in accordance with an example embodiment, outer reinforcement 100 may be divided into three sections: a low-strength section 110, a medium-strength section 120 and a high-strength section 130 disposed sequentially in the upward direction, and the respective parts 110, 120 and 130 may have different cross-sectional structures so as to have different strengths.

In FIG. 3, the left side of outer reinforcement 100 faces towards the front of the vehicle, and the right side of outer reinforcement 100 faces the rear of the vehicle. In the exploded cross-sectional views of low-strength section 110, medium-strength section 120 and high-strength section 130, the bottom side faces the exterior of the vehicle and the top side faces the interior of the vehicle.

As shown in FIG. 3, high-strength section 130 is formed by stacking a plurality of CFRP layers 200 for maximal strength. Medium-strength section 120 and low-strength section 110 are formed by substituting olefin-based fiber layers 300, formed by impregnating olefin-based fiber with a resin, for some of the plurality of CFRP layers 200 so as to reduce strength and increase toughness.

Olefin-based fiber has low density and Young's modulus and high tensile strength and fracture elongation, as compared to carbon fiber and, thus, olefin-based fiber layer 300 may complement the low toughness of CFRP layer 200.

In an example embodiment, the carbon fiber has specific physical properties, e.g., tensile strength of about 5000 MPa or more, fracture elongation of about 2% or less and a density of from about 1.5 to about 2 $g/cm^3$, and the olefin-based fiber has specific physical properties, e.g., tensile strength of about 600 MPa or more, fracture elongation of about 9% or more and a density of about 1 $g/cm^3$ or less. In such an embodiment, the olefin-based fiber has lower strength and higher fracture elongation than the carbon fiber.

As the percentage of CFRP layers 200 to total layers in outer reinforcement 100 increases, the strength of outer reinforcement 100 increases and the toughness decreases. As the percentage of olefin-based fiber layers 300 to total layers in outer reinforcement 100 increases, the strength of outer reinforcement 100 decreases and the toughness increases.

In an example embodiment, the strengths of the high-strength section 130, the medium-strength section 120 and the low-strength section 110 may be sequentially decreased by adjusting the thickness ratio of the olefin-based layers 300 in low-strength section 110 to be higher than the thickness ratio of the olefin-based layers 300 in medium-strength section 120.

In more detail, the thickness of the CFRP layers 200 in the low-strength section 110 may be from about 55 to about 75% of the total thickness of low-strength section 110, and the thickness of the olefin-based fiber layers 300 in the low-strength section 110 may be from about 25 to about 45% of the total thickness of low-strength section 110. The thickness of the CFRP layers 200 may be from about 70 to about 90% of the total thickness of the medium-strength section 120, and the thickness of the olefin-based fiber layers 300 120 may be from about 10 to about 30% of the total thickness of the medium-strength section 120.

In this embodiment of the present disclosure, each of high-strength section 130, medium-strength section 120 and low-strength section 110 includes 7 layers. All 7 layers of high-strength section 130 are CFRP layers 200. The total number of CFRP layers 200 and olefin-based fiber layers 300 of each of medium-strength section 120 and low-strength section 110 is 7, the strength and toughness of each of medium-strength section 120 and low-strength section 110 are adjusted by adjusting the number of olefin-based fiber layers 300. Although the respective thicknesses of the CFRP layers 200 and the olefin-based fiber layers 300 and the total thickness of the CFRP and olefin-based fiber layers 200 and 300 are not specifically limited, the thicknesses of the respective layers 200 and 300 may be limited to from about 0.36 to about 0.57 mm based on the manufacturing method, and the total thickness of the layers 200 and 300 may be limited to from about 2.5 to about 4.0 mm to achieve desired weight reduction effects and to secure the vehicle interior when a side collision occurs.

Furthermore, the total number of CFRP layers 200 and olefin-based fiber layers 300 may be changed according to the kind of the vehicle and kinds of applied parts.

In an example embodiment, low-strength section 110 may include olefin-based fiber layers 300 as the outermost layers facing the interior and exterior of the vehicle, and medium-strength section 120 may include an olefin-based fiber layer 300 as the outermost layer facing the exterior of the vehicle. That is, CFRP layers 200 serve as a core to improve strength, and olefin-based fiber layers 300 serve to surround the outer surfaces of CFRP layers 200 and prevent fracture of CFRP layers 200. Because placement of olefin-based fiber layers 300 towards the exterior of the vehicle, i.e., the direction from which the impact force of a side collision is applied, is more effective in absorbing impact, each of low-strength section 110 and medium-strength section 120 includes the olefin-based fiber layer 300 disposed towards the exterior of the vehicle, and low-strength section 110 further includes an olefin-based fiber layer 300 disposed towards the interior of the vehicle so as to lower strength and to increase toughness as compared to medium-strength section 120.

FIG. 4 illustrates a reinforcement structure in accordance with another example embodiment of the present disclosure. In the reinforcement structure in accordance with this embodiment, as compared to the reinforcement structure shown in FIG. 3, low-strength section 110 includes two olefin-based fiber layers 300 disposed towards the exterior of the vehicle and medium-strength section 120 further includes an olefin-based fiber layer 300 disposed towards the interior of the vehicle in addition to an olefin-based fiber layer 300 disposed towards the exterior of the vehicle, thus being capable of further improving toughness.

As shown in FIGS. 3 and 4, in either embodiment, the number and/or thickness of olefin-based fiber layers 300 of low-strength section 110 should be greater than the number and/or thickness of olefin-based fiber layers 300 of medium-strength section 120 so that low-strength section 110 may have lower strength than medium-strength section 120.

As shown in FIG. 5, in a reinforcement structure in accordance with another embodiment, strength and toughness of each of high-strength section 130, medium-strength section 120 and low-strength section 110 are varied by adjusting the ratio of carbon fiber 410 to olefin-based fiber 420 in a woven fabric 400 impregnated with a resin.

Although the partially enlarged cross-sectional views shown in FIG. 5 illustrate only a central portion of each of high-strength section 130, medium-strength section 120 and low-strength section 110 as woven from carbon fiber 410 and olefin-based fiber 420, the entirety of outer reinforcement 100 is substantially woven from carbon fiber 410 and olefin-based fiber 420.

High-strength section 130 is composed of a fiber board formed by impregnating fabric 400 woven only from carbon fiber 410 with a resin, i.e., CFRP, and the medium-strength section 120 and the low-strength section 110 are composed of fiber boards formed by impregnating fabric 400 woven from carbon fiber 410 and olefin-based fiber 420 with a resin.

Adjusting the ratio of carbon fiber 410 in low-strength section 110 to be lower than the ratio of carbon fiber 410 in medium-strength section 120 causes the strength of low-strength section 110 to be lower than that of medium-strength section 120.

In more detail, fabric 400 forming low-strength section 110 includes from about 50 to about 60% of carbon fiber 410 and form about 40 to about 50% of olefin-based fiber 420, and fabric 400 forming medium-strength section 120 includes from about 70 to about 80% of carbon fiber 410 and from about 20 to about 30% of olefin-based fiber 420.

By dividing low-strength section 110 and medium-strength section 120 from each other using fabrics 400 woven from carbon fiber 410 and olefin-based fiber 420, low-strength sections 110 and medium-strength sections 120 having complicated shapes may be easily formed.

For example, low-strength section 110 may form a specific shape so as to partially increase or decrease strength or to guide the deformation direction when a side collision occurs.

FIGS. 6(A) and 6(B) illustrate examples of such an embodiment. As shown in FIG. 6(A), some regions of medium-strength section 120 may protrude into low-strength section 110 and thus be connected to the lower portion of the vehicle or, as shown in FIG. 6(B), some regions of low-strength section 110 may protrude into medium-strength section 120 and thus be connected to high-strength section 130.

As is apparent from the above description, an impact-absorbing reinforcement structure for center pillars in accordance with the present disclosure has the effects described below.

First, the impact-absorbing reinforcement structure for center pillars may prevent passengers from being injured due to fracture of a center pillar.

Second, the impact-absorbing reinforcement structure for center pillars may reduce the weight of the center pillar and thus improve fuel efficiency.

Third, the impact-absorbing reinforcement structure for center pillars may achieve cost reduction using inexpensive olefin-based fiber.

Fourth, the impact-absorbing reinforcement structure for center pillars allows a part having different strengths by region to be manufactured as an integral body using a simple manufacturing method, thereby resulting in cost reduction and improved workability.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An impact-absorbing reinforcement structure for vehicle center pillars comprising a high-strength section, a medium-strength section and a low-strength section, divided from each other and integrally formed as one body, wherein:
   the high-strength section is composed of carbon fiber reinforced plastic formed by impregnating carbon fiber with a resin, and is disposed at an upper region of a vehicle center pillar;
   the low-strength section is composed of a composite material formed by impregnating carbon fiber and olefin-based fiber with a resin, has lower strength than the high-strength section, and is disposed at a lower region of the vehicle center pillar; and
   the medium-strength section is composed of a composite material formed by impregnating carbon fiber and olefin-based fiber with a resin, has strength between the strength of high-strength section and low-strength section, and is disposed at a central region of the vehicle center pillar.

2. The impact-absorbing reinforcement structure for vehicle center pillars according to claim 1, wherein:
   the high-strength section comprises a plurality of carbon fiber reinforced plastic layers formed by impregnating carbon fiber with the resin; and
   the low-strength section and the medium-strength section each comprise one or more first carbon fiber reinforced plastic layers formed by impregnating carbon fiber with the resin, and one or more olefin-based fiber layers formed by impregnating olefin-based fiber with the resin.

3. The impact-absorbing reinforcement structure for center pillars according to claim 2, wherein a ratio of a total thickness of the one or more olefin-based fiber layers in the low-strength section to an entire thickness of the low-strength section is higher than the ratio of the total thickness of the one or more olefin-based fiber layers in the medium-strength section to an entire thickness of the medium-strength section.

4. The impact-absorbing reinforcement structure for vehicle center pillars according to claim 3, wherein:
   the low-strength section comprises one or more carbon fiber reinforced plastic layers having a total thickness of from about 55 to about 75% of the entire thickness of the low-strength section, and one or more olefin-based fiber layers having a total thickness of from about 25 to about 45% of the entire thickness of the low-strength section; and
   the medium-strength section comprises one or more carbon fiber reinforced plastic layers having a total thickness of from about 70 to about 90% of the entire thickness of the medium-strength section, and one or more olefin-based fiber layers having a total thickness of from about 10 to about 30% of the entire thickness of the medium-strength section.

5. The impact-absorbing reinforcement structure for vehicle center pillars according to claim 2, wherein the number of olefin-based fiber layers of the low-strength section is greater than the number of olefin-based fiber layers of the medium-strength section.

6. The impact-absorbing reinforcement structure for center pillars according to claim 5, wherein:
   the low-strength section comprises 7 layers including 4-5 carbon fiber reinforced plastic layers stacked in parallel and 2-3 olefin-based fiber layers stacked on outer surfaces of the stacked carbon fiber reinforced plastic layers.

7. The impact-absorbing reinforcement structure for center pillars according to claim 6, wherein:
   the low-strength section comprises 7 layers including 5 carbon fiber reinforced plastic layers stacked in parallel and 2 olefin-based fiber layers stacked on the outer surfaces of the stacked carbon fiber reinforced plastic layers;
   wherein an olefin-based fiber layer of the low-strength section is disposed on a surface of the stacked carbon fiber reinforced plastic layers facing an interior of a vehicle inward and on the surface of the stacked carbon fiber reinforced plastic layers facing an exterior of the vehicle.

8. The impact-absorbing reinforcement structure for center pillars according to claim 6, wherein:
   the low-strength section comprises 7 layers including 4 carbon fiber reinforced plastic layers stacked in parallel and 3 olefin-based fiber layers stacked on the outer surfaces of the stacked carbon fiber reinforced plastic layers;
   wherein two olefin-based fiber layers of the low-strength section are disposed on a surface of the stacked carbon fiber reinforced plastic layers facing an exterior of a vehicle and one olefin layer is disposed on the surface of the stacked carbon fiber reinforced plastic layers facing an interior of the vehicle.

9. The impact-absorbing reinforcement structure for center pillars according to claim 5, wherein:
   the medium-strength section includes 7 layers including 5-6 first layers stacked in parallel and 1-2 second layers stacked on outer surfaces of the stacked first layers.

10. The impact-absorbing reinforcement structure for center pillars according to claim 9, wherein:
    the medium-strength section includes 7 layers including 6 carbon fiber reinforced plastic layers stacked in parallel and 1 olefin-based fiber layer disposed on a surface of the stacked carbon fiber reinforced plastic layers facing an interior of a vehicle.

11. The impact-absorbing reinforcement structure for center pillars according to claim 9, wherein:
    the medium-strength section includes 7 layers including 5 carbon fiber reinforced plastic layers stacked in parallel and 2 olefin-based fiber layers, wherein one olefin-based fiber layer is disposed on a surface of the stacked carbon fiber reinforced plastic layers facing the interior of the vehicle and one olefin-based fiber layer is disposed on the surface of the stacked carbon fiber reinforced plastic layers facing an exterior of the vehicle.

12. The impact-absorbing reinforcement structure for center pillars according to claim 1, wherein the low-strength section and the medium-strength section are manufactured by impregnating a fabric, woven from carbon fiber and olefin-based fiber, with the resin.

13. The impact-absorbing reinforcement structure for center pillars according to claim 12, wherein a ratio of the carbon fiber to the total fiber in the fabric forming the low-strength section is lower than a ratio of the carbon fiber to the total fiber in the fabric forming the medium-strength section.

14. The impact-absorbing reinforcement structure for center pillars according to claim 13, wherein:

the ratio of the carbon fiber to total fiber in the fabric forming the low-strength section is from about 50 to about 60%, and a ratio of the olefin-based fiber to total fiber in the fabric forming the low-strength section is from about 40 to about 50%; and the ratio of the carbon fiber to total fiber in the fabric forming the medium-strength section is from about 70 to about 80%, and a ratio of the olefin-based fiber to total fiber in the fabric forming the medium-strength section is from about 20 to about 30%.

15. The impact-absorbing reinforcement structure for center pillars according to claim 1, wherein:

the carbon fiber has a tensile strength of about 5000 MPa or more, fracture elongation of about 2% or less, and a density of from about 1.5 to about 2 $g/cm^3$; and the olefin-based fiber has tensile strength of about 600 MPa or more, fracture elongation of about 9% or more and a density of about 1 $g/cm^3$ or less.

* * * * *